United States Patent
Papasakellariou et al.

(10) Patent No.: US 6,873,667 B2
(45) Date of Patent: Mar. 29, 2005

(54) SPREAD SPECTRUM TIME TRACKING

(75) Inventors: Aris Papasakellariou, Richardson, TX (US); Yuan Kang Lee, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 792 days.

(21) Appl. No.: 09/755,799

(22) Filed: Jan. 5, 2001

(65) Prior Publication Data

US 2002/0034218 A1 Mar. 21, 2002

Related U.S. Application Data

(60) Provisional application No. 60/174,511, filed on Jan. 5, 2000.

(51) Int. Cl.[7] .............................. H04B 7/10; H04B 7/02; H04B 1/18
(52) U.S. Cl. ....................... 375/347; 375/267; 375/150; 455/132
(58) Field of Search ................................ 375/148, 150, 375/267, 324, 347; 342/378; 455/132

(56) References Cited

U.S. PATENT DOCUMENTS

| | | | | |
|---|---|---|---|---|
| 5,654,980 A | * | 8/1997 | Latva-aho et al. | 375/148 |
| 5,768,307 A | * | 6/1998 | Schramm et al. | 375/150 |
| 5,978,423 A | * | 11/1999 | Farjh | 375/347 |
| 6,249,251 B1 | * | 6/2001 | Chang et al. | 342/378 |
| 6,377,614 B1 | * | 4/2002 | Yamashita | 375/149 |
| 6,421,373 B1 | * | 7/2002 | Saito | 375/148 |
| 6,483,459 B1 | * | 11/2002 | Hou et al. | 342/378 |
| 6,504,816 B1 | * | 1/2003 | Lee et al. | 370/204 |

* cited by examiner

*Primary Examiner*—Amanda T. Le
*Assistant Examiner*—Lawrence B. Williams
(74) *Attorney, Agent, or Firm*—Carlton H. Hoel; W. James Brady; Frederick J. Telecky, Jr.

(57) ABSTRACT

Time tracking units with decision statistics mitigating or correcting for influences from nearby interfering paths. Interference mitigation is accomplished by appropriately selecting the parameters of the time tracking unit so that the contribution of the interference on the decision statistics of the time tracking unit is minimized. Interference cancellation is accomplished by evaluating and subtracting of the effect from the interfering paths on the decision statistics of the time tracking unit. Both urban and indoor communications may incorporate the interference avoidance or interference correction either in each time tracking unit of a rake-type receiver by inter-unit communication of timing adjustments and path energies or by software within a common processor.

8 Claims, 3 Drawing Sheets

— TIME LIMITED SIGNAL
--- BAND LIMITED SIGNAL

SPREAD SPECTRUM TIME TRACKING

CROSS-REFERENCE TO RELATED APPLICATIONS

This application claims priority from provisional application Ser. No. 60/174,511 filed Jan. 5, 2000.

BACKGROUND OF THE INVENTION

The invention relates to electronic devices, and, more particularly, to time tracking in spread spectrum communications and related circuitry and methods.

Spread spectrum wireless communications utilize a radio frequency bandwidth several orders of magnitude greater than the minimum bandwidth required for the transmitted data rate, but many users may simultaneously occupy the bandwidth. Each of the many simultaneous users has a pseudo-random CDMA code to "despread" by correlation the spread spectrum signal sent to that user and thereby recover the corresponding information data. The pseudo-random CDMA code may be an orthogonal (Walsh) code, a pseudo-noise (PN) code, a Gold code, or combinations (modulo-2 additions) of such codes. After despreading the received signal at the correct time instant, the user recovers the corresponding information while the remaining interfering signals and noise appear noise-like. For example, the interim standard IS-95 for such CDMA communications employs channels of 1.25 MHz bandwidth and a code pulse (chip) interval $T_c$ of 0.8136 microsecond with 64 chips per transmitted bit. The recent WCDMA proposal employs 3.84 MHz bandwidth and the CDMA code length applied to each information symbol may vary from 4 chips to 256 chips. The CDMA code for each user is typically produced as the modulo-2 addition of a Walsh code with a pseudo-random code (two pseudo-random codes for QPSK modulation) to improve the noise-like nature of the resulting signal. A cellular system as illustrated in FIG. 5 could employ IS-95 or WCDMA for the air interface between the base station and the mobile station.

A receiver synchronizes with the transmitter in two steps: code acquisition and code tracking. Code acquisition is an initial search to bring the phase of the receiver's local code generator to within typically a half chip of the transmitter's, and code tracking maintains fine alignment of chip boundaries of the incoming and locally generated codes. Conventional code tracking utilizes a delay-lock loop (DLL) or a tau-dither loop (TDL), both of which are based on the well known early-late gate principle. These approaches provide good performance for the case of a single transmission path or for the case of several paths that are separated in time by an amount greater than the non-zero range of the discriminator characteristic of the time tracking unit. FIG. 2 illustrates a typical digital demodulator and FIG. 3 illustrates a typical DLL circuitry usable in the demodulator of FIG. 2.

In particular, a DLL correlates the received signal by two outputs of the local code generator: one delayed by $\delta$ and one advanced by $\delta$ where the offset $\delta$ is less than one chip interval $T_c$. The result of these correlations, together with the correlation at the perceived "on time" instant, form the decision statistics of the time tracking unit. The time tracking method can be coherent or non-coherent. The former approach attempts to eliminate the phase rotation introduced by the channel and remove in this way the phase dependence from the decision statistics. The latter approach removes the phase dependence by squaring the result of the correlation and considering only the resulting magnitude. The latter approach is simpler, and for the cases of interest, it provides practically the same symbol-error-rate (SER) performance as the former.

The late $R_+(\delta)$ and early $R_-(\delta)$ correlations of the local code with the received signal are squared and subtracted. The sign of the result indicates towards which of the two instants the actual "on time" instant of the received signal is closer. The value of the result indicates the degree of proximity. Since the value of the result also depends on the strength of the received signal, to remove this dependence and have the final decision statistic depend only on the time error, the result of the subtraction is divided by the square of the correlation at the perceived "on time" instant. This serves to normalize the decision statistic in terms of signal power. The final decision statistic is therefore given as $$S=(R^2_+(\delta)-R^2_-(\delta))/R^2(0)$$

and depends only on the time error and not on the received signal power or phase. S is known as the discriminator curve or S-curve (because of its shape) of the tracking loop and an example can be seen in FIG. 4. The absolute value of S is compared against a threshold value and, if it is larger, the "on time" sampling instant is changed by one sample in the direction specified by the sign of S, while if it is smaller, no change is made in the sampling instant. The purpose of the threshold is to ensure that a time correction takes place only when the time error exceed a certain value and to help guard to a certain extent against poor quality values of the decision statistic that may be caused by noise and fading.

The TDL operates analogously but employs only a single multiply loop. The TDL dithers the clock (forward and backward delay) by $\delta$ and emulates the DLL with a comparison of advanced and delayed clock samples of the code multiplication with the received signal. Typically, DLL/TDL circuitry utilizes sampling of various signals at rates such as 8 samples per chip (or 4 samples per chip), and the offset $\delta$ would be in the range of 1–4 samples (or 1–2 samples for a sampling rate of 4 samples per chip).

In a multipath situation a Rake receiver has individual demodulators (fingers) tracking separate paths and combines the results to improve signal-to-noise ratio (SNR) according to a method such as the maximal ratio combining (MRC). Thus a Rake receiver typically has a number of DLL or TDL code tracking loops together with control circuitry for assigning tracking units to received paths.

However, in many applications, the time separation of multiple paths is less than or equal to the range of the discriminator characteristic of the tracking DLL/TDL. Moreover, such multipaths are nearly continuous in nature in the sense that there are frequently strong enough paths with time separation much less than one chip interval. Whenever such paths cannot be separated, they appear as a single path that exhibits fading. In many communication environments, such as urban and indoor, there is a considerable probability that sufficiently strong multipaths are separated by an amount comparable to the chip interval and hence are well within the non-zero range of the discriminator characteristic of the DLL/TDL tracking loop. The discriminator characteristic (S-curve) is typically non-zero for an advance/delay of up to 1.2–1.5 chips depending on the value of the early/late offset $\delta$; see FIG. 4. Prominent examples of communication systems that exhibit these problems are the IS-95 and wideband CDMA cellular/PCS systems in urban and indoor environments.

Whenever two or more paths that are used for demodulation (as in a Rake receiver) are separated in time by less than the non-zero range of the discriminator characteristic of the tracking DLL/TDL, the decision statistics (one or more of the early, late, and "on time" correlations) of the DLL/TDL for each path are affected by the presence of the other path. In other words, the shape of the S-curve itself may change and the actual results may be different than the ones theoretically expected. This can significantly degrade the performance of the conventional DLL/TDL and lead to unacceptably large time errors. Moreover, the decision statistics for the weaker path may be completely overwhelmed by the presence of the interfering, stronger path. This can lead to complete loss of synchronization for the weaker path. It is therefore highly desirable to mitigate those effects and eliminate the shortcomings of the conventional DLL/TDL time tracking methods in multipath channels. The problem of having interfering paths affecting the decision statistics of the tracking unit of a desired path was identified by A. Baier, et. al. in "Design Study for a CDMA-Based Third Generation Mobile Radio System", IEEE JSAC, Vol. 12, May 1994, pp. 733–743. The authors proposed tracking the envelope of each path instead of relying on the tracking unit decision statistics.

SUMMARY OF THE INVENTION

The present invention provides a correction for the decision statistics for a spread spectrum time tracking unit based on the state(s) of other time tracking units in a receiver.

This has the advantages of providing better tracking decisions when two or more paths are separated in time by an amount less than the range of the discriminator characteristic, or S-curve, of the time tracking unit.

The correction is based on the subtraction from affected decision statistics of the time tracking unit of the interference from paths within the range of the S-curve. The interference is evaluated based on the relative time separation, which allows the evaluation of the correlation value between each interfering path and each decision statistic of the time tracking unit, and on the energy of the interfering path. The relative path separation in samples is maintained at the time tracking unit of each path by providing information about the initial time difference of the paths and about the time updates of the time tracking units for the other paths.

Another approach is based on preventing the time tracking units of the interfering paths to bring the paths closer than 1 chip interval. The time tracking unit of the stronger path is allowed to perform correction while the time tracking unit(s) of the weaker path(s) are forced to always maintain a relative separation of 1 chip or more. The existence of the weaker paths is then determined based on the energy measurement at the perceived "on time" instant for these paths. If a weaker path is deemed usable, based on the energy estimate, its tracking continues, otherwise the corresponding demodulation fingers are de-assigned and deemed free to be used for the demodulation of another path, if one exists.

BRIEF DESCRIPTION OF THE DRAWINGS

The drawings are heuristic for clarity.

DESCRIPTION OF THE PREFERRED EMBODIMENTS

Overview

Figure 1:
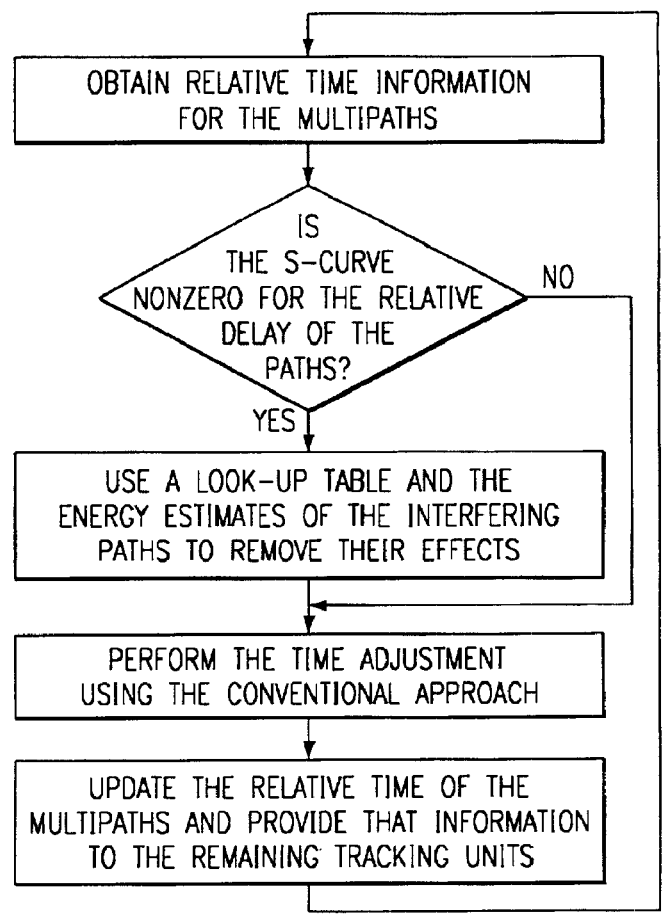
FIG. 1 is a flow diagram of a first preferred embodiment interference suppression.
Figure 2:
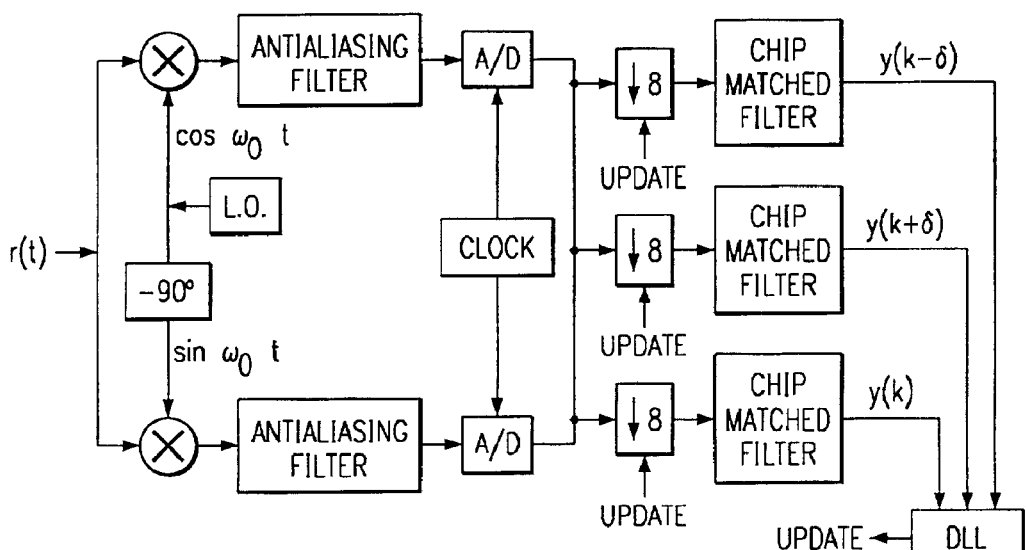
FIG. 2 shows a demodulator with a delay-locked loop.

The preferred embodiments may be used with Rake-type receivers of spread spectrum communications which have two or more time tracking units. The preferred embodiments exploit the ability of each of the time tracking units to have knowledge of the relative timing of the remaining demodulated paths and to then cancel out interfering paths which have time differences within the non-zero portion of the unit's discriminator characteristic from the decision statistics forming that characteristic (S-curve). A look-up table, with a number of finite values equal to the number of samples per chip interval, may be used for the cancellation computations in order to provide a code auto-correlation value for time separation corresponding to a specific number of samples that is less than the total number of samples per chip. FIG. 1 summarizes the first preferred embodiments.

Note that interim standard IS-95 and the wideband CDMA (WCDMA) proposals include a pilot signal which is much stronger than the data signals and can be used for time (code) tracking.

First Preferred Embodiment

Figure 3:
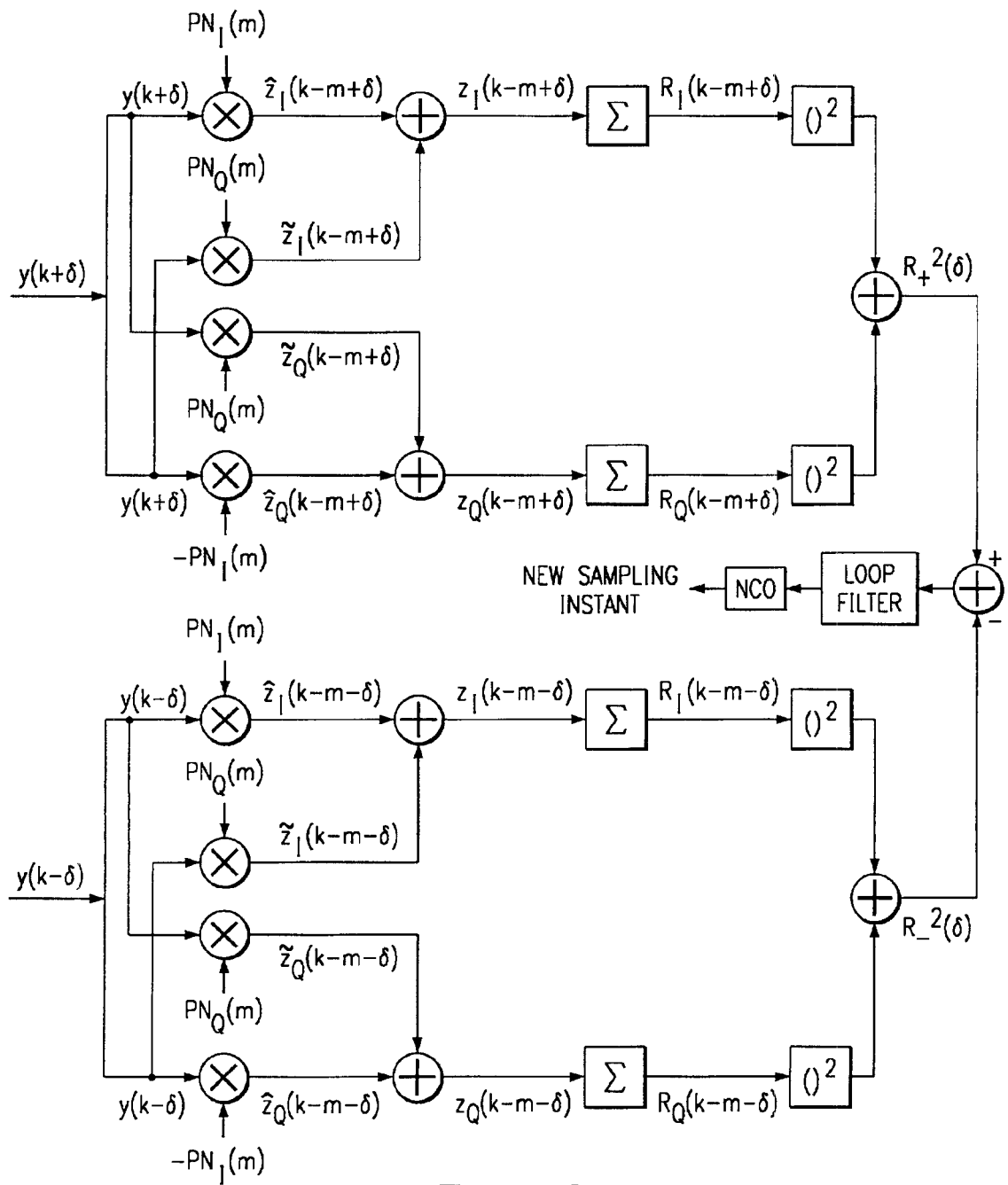
FIG. 3 illustrates a delay-locked loop.

A code time tracking unit as illustrated in FIG. 3 has various design parameters which are further defined immediately after their presentation. These parameters provide differing unit control characteristics. The first preferred exemplary embodiment tracks a pilot signal and has the following parameters for the case of 8 samples per chip interval:

(a) a DLL loop.
(b) decision statistics formed with coherent averaging followed by non-coherent averaging.
(c) threshold value equal to 0.16.
(d) time correction size of 1 sample.
(e) early/late offset of 2 samples for path distances of at most 12 samples and offset of 4 samples otherwise.
(f) duration of coherent averaging periods of 50 microseconds.
(g) update rate of 20 milliseconds.
(h) no loop filter.

Other parameter values can be readily chosen to those skilled in the art. The decision statistics (b) are formed by first coherently averaging the known symbol stream of a pilot signal or of a demodulated data signal for a time period over which the phase distortion introduced by the channel remains approximately constant. The non-coherent averaging that follows provides the simplest implementation for the removal of the phase dependence from the decision. Non-coherent averaging is basically performed by averaging the magnitude of the coherently averaged signal. For a QPSK modulated signal, this is equivalent to computing $I^2+Q^2$, where I is the in-phase component and Q is the quadrature component, and averaging its value over several coherent averaging periods. Alternatively, an approximation to $\sqrt{I^2+Q^2}$ may be evaluated because of simpler implementation.

Figure 4:
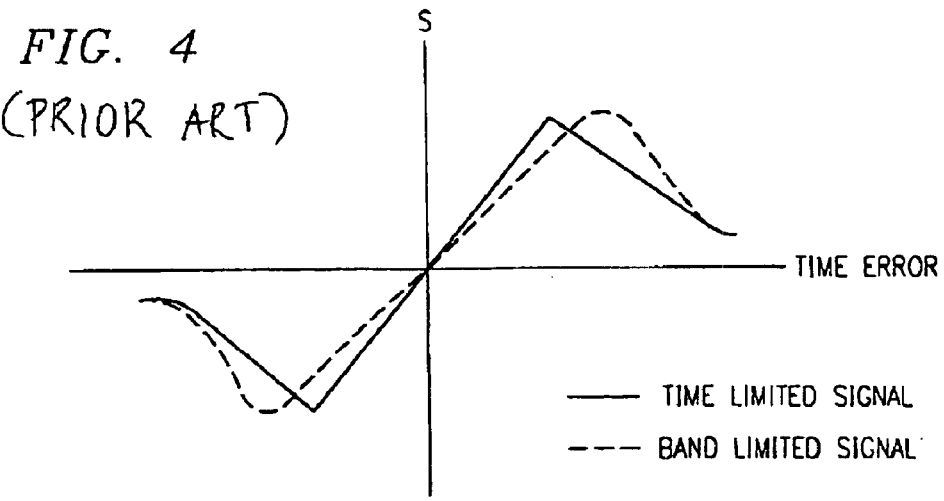
FIG. 4 shows the discriminator characteristic or S-curve for delay-locked loops and tau-dither loops.
Figure 5:
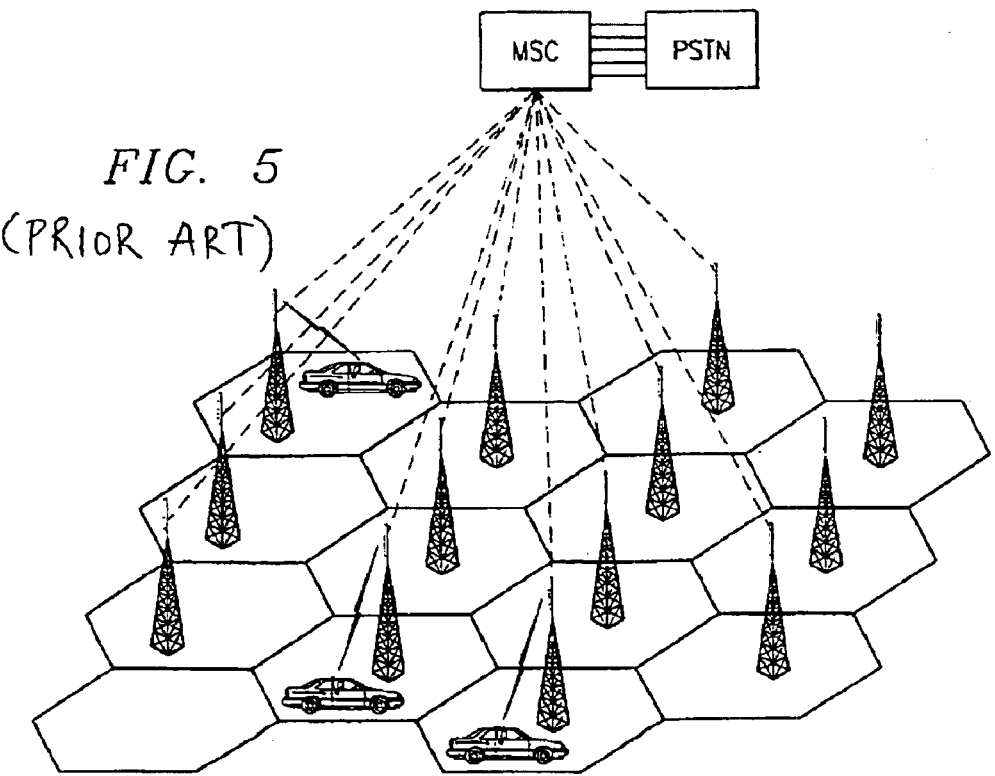
FIG. 5 illustrates a cellular system.

The threshold (c) for the decision statistic (the value of the S curve of FIG. 4 at which a delay of one sample is inserted or removed in order to adjust the timing synchronization) and the offset (e) are related and selected as follows. The objective is to achieve and maintain an absolute average time error with an average value smaller than half sample period and maximum value less than 1 sample. Therefore, the tracking unit should respond to time errors close to or larger than 0.5 sample and do so before the time error approaches 1 sample (note that the time adjustment can only be a multiple of a sample). Notice that a time correction of 2 or more samples will necessarily introduce or have to tolerate time errors larger than 1 sample. Since most frequently the time error will be less than 1 sample, the time correction should be one sample. This specifies the choice of parameter (d). Moreover, the threshold should be such that it provides some immunity to the variations of the decision statistics due to fading and noise. Therefore, since a large SNR provides immunity to noise and non-coherent averaging (large update period in the order of 10 msec) provides relative immunity to fading, the threshold value should be within the decision S curve values for time errors in the range of 0.4 to 0.7 samples. For non-coherent averaging, the S curve value when the time error is t and the early/late offset is 6 is computed as $$S=(R(t+\delta)^2-R(t-\delta)^2)/2R(t)^2$$

where R is the autocorrelation; for a bandlimited signal $R(\tau)=\sin(\pi\tau/T_c)/\pi\tau/T_c$. Thus computing the values of S for various offsets (1, 2, 3, or 4 samples) and various time errors (0.5, 1, 2, and 3 samples) indicates that the best discriminator characteristic occurs for a threshold (c) in the range [0.12, 0.20] (based on $\sqrt{I^2+Q^2}$) and an offset (e) of 4 samples. However, this needs to be modified for the case that the multipaths are separated by 12 samples or less (i.e., close to one chip) in order to account for the presence of interference.

It is preferable to decrease the discriminating ability of the S-curve by having an early/late offset smaller than 4 samples in order to reduce the non-zero range of the S-curve, increase the time separation between the early or late instant and the interfering path, and thereby decrease the effect of the interference on the decision statistics of the tracking unit. Thus, if paths separated by 12 or less samples are assigned to Rake fingers, a preferable value for the early/late offset is 2 samples. This value still maintains good discriminating ability for the S-curve, relative to a value of 1 sample, while providing better interference immunity than a value of 3 or 4 samples.

The choices for (f), the duration of the coherent and non-coherent averaging periods, are determined by the phase stability properties of the channel and the update rate (g), respectively. The latter depends on the total time drift (due to the clock error and the Doppler shift) and on the performance of the time tracking unit. The phase stability of the channel is about 50–100 microseconds for frequencies around 2 GHz and about twice as large for frequencies around 1 GHz. The phase stability also depends on the mobile's speed with the channel changing faster for higher speeds. The number of non-coherent averaging periods is determined by the update rate. Assuming a time clock accuracy after correction of 0.3 ppm and a maximum speed of 200 Km/h, the maximum time drift, including the Doppler shift, of the mobile's clock is 0.5 ppm. Thus, after each update period the maximum time error in samples is $$\Delta t=(\text{time drift})*(\text{samples/chip})*(\text{update period})$$

For an update period of 10 milliseconds, 20 milliseconds, and 40 milliseconds, the sample time error is 0.056, 0.112 and 0.224 samples, respectively. The main consideration in choosing the update rate value is to provide immunity to the decision statistics of the time tracking unit from the deep fades that may be experienced by the signal as it is transmitted through the channel. The smaller the mobile speed, the longer the fade lasts, and the duration may exceed 20 milliseconds for relatively small mobile speeds. If the Doppler shift is roughly estimated at the receiver, the update rate can be adjusted according to the expected fade duration. This is because the Doppler shift is related to the mobile speed and the expected fade duration. However, the update rate cannot become as large as for the time drift between update periods to approach or exceed 0.5 chips. Therefore, the update rate is lower bounded by the requirement to provide immunity to the decision statistics against fading and it is upper bounded by the requirement for the time drift between successive update rates to be adequately smaller than 0.5 samples. The latter requirement takes precedence of the former whenever both of them cannot be fulfilled.

Moreover, if the time drift during each update period is smaller than half sample, a second order time tracking loop is generally not needed. Otherwise, a second order time tracking loop is needed in order to accommodate the large time drift and account for the Doppler and clock shift after every update period. The update period can then be made large enough to overcome most channel fades.

In urban and indoor areas the path separation can be very small, as small as 1 chip (8 samples) or less, and the decision statistics of a time tracking unit with a large early/late offset may be considerably affected by the presence of other paths. This can cause noticeable performance degradation and even loss of lock. Indeed, if two paths are separated by just one chip (or slightly more), the early statistic of the weaker path may be dominated by a stronger path that arrives on the early side and the same applies for the late statistic when the stronger path arrives on the late side. The presence of the stronger path may overwhelm the actual statistics generated for the weaker path or even change the correct sign of the early/late difference. If no provisions are taken in this case, the time tracking unit of the weaker path may gradually shift the perceived "on time" instant towards the stronger path and the two paths will be perceived as collapsing into one.

One approach to avoid the above problem is to disregard time updates that cause the time difference of two paths to become smaller than one chip. If the time difference between two paths actually becomes smaller than one chip, the energy estimate will indicate that event by producing a signal-to-interference ratio at the time instant of 1 chip, relative to the stronger path, that is too small to be useful. Then, the weaker path may be disregarded and the corresponding demodulation element may be labeled free for assignment to another path, if one exists. Otherwise, the weaker path may still be considered to exist at 1 chip distance from the stronger path. Paths that are actually separated by much less than a chip should not be tracked because they cannot be perfectly distinguished after despreading (mutual interference cannot be adequately suppressed) and the degree of diversity is reduced since the two paths are no longer completely independent. In that case, only the tracking of the stronger path should continue.

The provision to prohibit the "on time" instants of two or more paths from coming closer than one chip may not avoid a significant increase in the time error unless one of the paths, preferably the stronger one, is allowed unconstrained time updates. For example, consider two paths separated by 1 chip interval (or another time separation anywhere in the non-zero range of the S-curve). If the weaker path arrives later (earlier) and the time drift, due to clock mismatch and Doppler, is positive (negative), the time tracking unit of the weaker path will try to follow the clock drift but it will be inhibited from the interference from the stronger path which will in effect indicate the opposite time direction. Constraining the time updates to be such that the two paths do not come closer than 1 chip may prohibit the time tracking unit of the stronger path from making the correct decision. This is because the time tracking unit of the weaker path may not be able to move the perceived "on time" instant and increase the perceived minimum path distance to 9 samples in order to allow the tracking unit of the stronger path to make the correct decision. Obviously, the larger the early/late offset, the more prominent those effects will be. This can be avoided by always allowing the stronger path to move without constraints, enforce on a weaker path a relative distance from the stronger path that is always 1 chip or larger (that is, time tracking updates bringing the weaker path closer than 1 chip to the stronger one are neglected), and determine the actual existence of the weaker path at the presumed offset by the resulting SIR measurement at that offset. This provision may be avoided by employing cancellation of the effect from the interfering path(s) on the statistics of the affected time tracking units. This is discussed in detail later in the invention.

The first preferred embodiment may also exploit the ability of each time tracking unit of a Rake-type receiver to have knowledge of the relative timing of paths tracked by the other time tracking units. This information can be provided by the software through knowledge of the PN code offsets used for despreading of the received signal paths and the sample taken for each signal path (out of a total of say 8 samples, 1 sample is selected as the one being "on time"). The PN code offset and the selected sample depends on the relative arrival time of the paths and on the accumulated time correction associated with each time tracking unit. Alternately, each time tracking unit can maintain the relative time information itself through inter-unit communication of the time updates among all time tracking units. FIG. 1 illustrates the first preferred embodiment method for the cancellation of the interference effects from other demodulated paths on the decision statistics of the time tracking loop. It assumes that the paths causing interference are separated by 1 chip interval or less.

In particular, the look-up table contains the energy-independent effects of the interfering paths on the decision statistic of each individual time tracking unit. Those effects are described by a vector whose elements have a one-to-one correspondence with the discrete relative delay (in number of samples) of an interfering path. The actual effect from interfering paths on the S-curve of the time tracking unit of another path can be fully determined if the relative delay and the energy of the interfering paths are known. The relative delay if initially obtained using the knowledge of the offsets of the PN code used for despreading the multiple paths and the selected sample. The time information is subsequently maintained at each tracking unit by using its own time updates and importing the time update information from the other time tracking units. Alternately, the software can provide the relative time information by comparing the PN code offsets used for despreading the paths and the selected samples. The energy of the multiple paths can also be provided by the respective tracking units because each tracking unit requires and obtains knowledge of the energy for the path it tracks. This energy estimate is used to normalize the decision statistic of the time tracking unit as it was previously described (square value of the "on time" correlation).

Once the energy of the interfering path and its relative time delay from the reference path are known, its effect on the decision statistics (S-curve) of the reference time tracking unit can be fully determined. The sign of the net effect of the interfering path's contribution (negative or positive) depends on how the decision statistic is formed and whether each interfering path arrives earlier or later. For example, a path arriving later than the reference path will have a greater effect on the "late" part of the decision statistic of the tracking unit. Thus if the decision statistic is formed as "late" minus "early" correlations, the later-arriving path will influence the decision statistic by increasing its actual value. This is because the paths are assumed to be separated by less than 1 chip. Therefore, the correlation value of the interfering path with the late decision statistic of the time tracking unit will always be positive and greater than the correlation values with the early and "on time" decision statistics.

The effect of the interfering path is quantified by the correlation value scaled by the interfering path energy. The signal used for time tracking is assumed to be demodulated; this is the case when a pilot signal is used or when the data signal is used after tentative decisions are made on the data symbols in order to remove the data uncertainty and provide a known symbol stream. The effect of the interfering path can then be subtracted from the late statistic of the time tracking unit of the reference path, or from the "on time" and early statistics if the corresponding correlation value is also non-zero. Same arguments apply for the early decision statistic when the interfering path arrives earlier than the reference path. If the path separation is small enough for the interfering path to be separated by less than 1 chip from both the early, late, and "on time" instants, its effect should be subtracted from all corresponding statistics.

The functionality of the invention can be summarized as follows. The conventional approach is used for time tracking when all paths assigned to Rake fingers are separated in time by an amount that is large enough so that no path affects the decision statistics of the time tracking unit of another path. Typically, time separation larger than 1.5 chip intervals is adequate for the previous condition to be met. For paths separated in time by more than 1 chip and their time tracking unit decision statistics experience interference from other paths, the interference effect can be mitigated or completely avoided by reducing the early/late offset of the affected time tracking units below its normal (optimally designed) value. For example, reducing the early/late offset from half chip to quarter chip will remove any effect that an interfering path, separated in time by 1.25 to 1.5 chips from the reference path, has on the time tracking unit decision statistics of the reference path. For paths separated in time by more than 1 chip and, for the selected early/late offset value, interference with the time tracking unit decision statistics cannot be avoided, one option is to neglect time updates for the weaker path is they bring the paths closer than 1 chip interval in time. Time updates for the stronger path are allowed and the existence of the weaker path is determined by an SIR measurement at 1 chip interval away from the stronger path (in the direction of the weaker path). Another option is to allow all time updates and if the paths are deemed to be separated by 1 chip interval or less, perform cancellation of the interference from one path on the time tracking decision statistics of the other.

The following code excerpt illustrates a preferred embodiment interfering path correction for the simple situation of two paths. It is assumed that the interfering path affects only the late decision statistic while the effect on the "on time" statistic is either zero or negligible (time separation of 7 or 8 samples). In this code the prefix S indicates a state variable which may change, the prefix P indicates a parameter set for a simulation, and the prefixes I and O indicate input and output during iterations. The second path is assumed to arrive later than the first path and consequently, its correlation increases the value of the late statistic.

For the first-arriving path tracking unit:

```
Dstat = I_earlylate - S_corr[S_dist - I_tm2] * I_ontime2;
if ( |Dstat| > P_threshold * I_ontime1 ) {
    if ( Dstat > 0 ) {
        O_dtime = P_step;
        S_dist = S_dist - P_step - I_tm2;
    }
    else {
        O_dtime = P_step;
        S_dist = S_dist + P_step - I_tm2;
    }
}
```

In the foregoing code the first line defines the decision statistic "Dstat" to be the usual "late" offset correlation minus the "early" offset correlation for the first-arriving path timing (I_earlylate=I_late-I_early) minus an interfering contribution from the second-arriving path made up of the product of two terms: S_corr[S_dist-I_tm2]*I_ontime2. The other lines of code adjust these state variables in response to changes in the timings.

The variable S_dist is the distance (number of samples) from the first-arriving path time to the second-arriving path time. I_ontime2 is the energy of the second-arriving path. I_tm2 is an adjustment of the time for the second-arriving path; this comes from the time tracking unit for the second-arriving path and is sent to the time tracking unit of the first arriving path (or is done in the receiver software).

I_tm2 is equal to P_step if the decision to move the "on time" instant towards the early instant is made, it is equal to −P_step if the decision to move the "on time" instant towards the late instant is made, and it is equal to zero if the decision to make no correction is made.

The vector S_corr[ . . . ] component index (S_dist-I_tm2) relates to the distance (time separation) of the second-arriving path from the first-arriving path using the current timing. Vector S_corr[ . . . ] comprises of correlation values from the second arriving path for various relative delays in samples. For example, for 8 samples per chip, S_corr[ . . . ] may have the following component values: S_corr[0]=1.00, S_corr[1]=0.95, S_corr[2]=0.81, S_corr[3]=0.62, S_corr[4]=0.41, S_corr[5]=0.22, S_corr[6]=0.09, S_corr[7]=0.02, and S_corr[n]=0.00 for all n≧8.

The absolute value of statistic "Dstat" exceeding the threshold (P_threshold*I_ontime) implies a needed adjustment to the timing of the first-arriving path; and O_dtime is the output time adjustment. For "Dstat" positive, O_dtime is negative, and for "Dstat" negative, O_dtime is positive (O_dtime will form I_tm1 to perform time tracking for the second path). P_step is the number of samples in a time adjustment; typically, P_step=1.

Because the tracking unit for the stronger path makes the more reliable time correction, the tracking unit of the weaker path may use the time correction from the current update period for the stronger path while the tracking unit of the stronger path may use the time correction from the previous update period for the weaker path.

As a heuristic example, consider the decision statistic for a normalized first-arriving path $y(n)$ using an offset of 2 samples and a pseudo-noise code $c(n)$, the desired decision statistic is:

$$c(n)[y(n+2)-y(n-2)]$$

However, a delayed second-arriving path $Ay(n-k)$, with $A$ the relative amplitude and $k$ the positive delay in samples, $k$ being smaller than the number of samples per chip, yields a received signal $y(n)+Ay(n-k)$ and the tracking loop generates:

$$\Sigma c(n)[(y(n-2)+Ay(n-k-2))-(y(n+2)+Ay(n-k+2))]=\Sigma c(n)[y(n-2)-y(n+2)]+A\Sigma c(n)[y(n-k-2)-y(n-k+2)]$$

$$\cong \Sigma c(n)[y(n-2)-y(n+2)]-A\Sigma c(n)c(n-k+2)$$

because $A\Sigma c(n)y(n-k-2)$ is negligible compared to $A\Sigma c(n)y(n-k+2)$ for $k$ positive, and $y(n-k+2)\cong c(n-k+2)$ if the second path timing is accurate. Thus the correction for interference should subtract $A\Sigma c(n)c(n-k+2)$. Hence, the decision statistic, including interference cancellation, equals $$\Sigma c(n)[(y(n-2)+Ay(n-k-2))-(y(n+2)+Ay(n-k+2))]-A\Sigma c(n)c(n-k+2)$$
$$\cong \Sigma c(n)[y(n-2)-y(n+2)]$$

where the first sum is just I_earlylate, A corresponds to I_ontime2, the second sum is S_corr[S_dist+I_tm2] for S_dist=k−2, and I_tm2=0 reflects the accurate second path timing (no correction).

The code for the functionality of the second time tracking unit is similar to that of the first, but with the interference effects now applying to the opposite decision statistic (early instead of late).

Alternative Preferred Embodiments

The first preferred embodiments could be varied in how they modify the decision statistic to account for nearby paths. In particular, a weighted combination of simultaneous multiple early-late offset cross-correlations with corresponding nearby path corrections could be used for the decision statistic.

Modifications

The preferred embodiments can be modified in various ways while retaining the features of a correction to the decision statistic of a tracking unit based on the states of one or more of the other tracking units in a multipath receiver.

For example, the S_corr[ . . . ] vector could have different component values; the time tracking units may have different selections for their parameter values, the decision statistics may be formed coherently, the sampling rate may be different than 8 samples per chip, etc.

What is claimed is:

1. A method for performing time tracking of two or more paths of a spread spectrum signal in a spread spectrum communications receiver using correlations of the received spread spectrum code with a local code replica at time instants which are early, late and on_time relative to the perceived path arrival time, thereby providing statistics at these instances, comprising the steps of:

(a) determining the mutual distances between the on_time instance of one path and the early, and/or late, and/or on_time instance as used by the time tracking unit of the other path;

(b) determining whether any of said distances is smaller than one element of said spread spectrum code; and (c) changing the separation between early and on_time, and late and on_time instances if any of said distances in (b) is smaller than one element of the spread spectrum code.

2. A method for performing time tracking of two or more paths of a spread spectrum signal in a spread spectrum communications receiver using correlations of the received spread spectrum code with a local code replica at time instants which are early, late and on_time relative to the perceived path arrival time, thereby providing statistics at these instances, comprising the steps of:

(a) determining the mutual distances between the on_time instance of one path and the early, and/or late, and/or on_time instance as used by the time tracking unit of the other path;

(b) determining whether any of said distances is smaller than one element of said spread spectrum code; and (c) disregarding updates of said time tracking unit corresponding to the path having smaller power than the other path if any of said distances in (b) is smaller than one element of the spread spectrum code.

3. The method of claim 2 where further demodulation of the path with disregarded updates of said time tracking unit is based on a power measurement.

4. The method of claim 2 where the path with disregarded updates of said time tracking unit is not further considered for demodulation.

5. A method for performing time tracking of two or more paths of a spread spectrum signal in a spread spectrum communications receiver using correlations of the received spread spectrum code with a local code replica at time instants which are early, late and on_time relative to the perceived path arrival time, thereby providing statistics at these instances, comprising the steps of:

(a) determining the mutual distances between the on_time instance of one path and the early, and/or late, and/or on_time instance as used by the time tracking unit of the other path;

(b) determining whether any of said distances is smaller than one element of said spread spectrum code; and (c) disregarding updates of said time tracking unit corresponding to the path having smaller power than the other path if said updates make the distance between the "on_time" instances of the two paths less than one of said code element.

6. The method of claim 5 where further demodulation of the path with disregarded updates of said time tracking unit is based on a power measurement.

7. The method of claim 5 where path with disregarded updates of said time tracking unit is not further considered for demodulation.

8. A method for performing time tracking of two or more paths of a spread spectrum signal in a spread spectrum communications receiver using correlations of the received spread spectrum code with a local code replica at time instants which are early, late and on_time relative to the perceived path arrival time, thereby providing statistics at these instances, comprising the steps of:

(a) determining the mutual distances between the on_time instance of one path and the early, and/or late, and/or on_time instance as used by the time tracking unit of the other path;

(b) determining whether any of said distances is smaller than one element of said spread spectrum code;

(c) measuring the power of said paths; and (d) evaluating and subtracting, based on said distances and power of said path, the contribution of each path on the statistic value of said early, and/or said on_time, and/or said late instance of the other path.

* * * * *